United States Patent [19]

Dalton

[11] Patent Number: 4,498,336
[45] Date of Patent: Feb. 12, 1985

[54] TORQUE MEASURING DEVICE

[75] Inventor: Thomas B. Dalton, Muskegon, Mich.

[73] Assignee: Dyna-Torque, Inc., Southfield, Mich.

[21] Appl. No.: 458,056

[22] Filed: Jan. 14, 1983

[51] Int. Cl.³ .......................................... G01M 19/00
[52] U.S. Cl. .................................... 73/168; 73/1 C;
                                      73/862.23; 73/862.29
[58] Field of Search ............... 73/168, 1 C, 862.08,
      73/862.36, 862.37, 862.23, 862.29; 116/277;
                                            251/129, 134

[56]          References Cited
          U.S. PATENT DOCUMENTS

| | | | |
|---|---|---|---|
| 2,955,454 | 10/1960 | Husher | 73/1 C |
| 3,011,332 | 12/1961 | Skidmore | 73/1 C |
| 3,130,574 | 4/1964 | Waters et al. | 73/1 |
| 3,255,624 | 6/1966 | Larson | 73/1 |
| 3,475,952 | 11/1969 | Schmalbruch | 73/134 |
| 4,154,097 | 5/1979 | Scott | 73/134 |
| 4,199,032 | 4/1980 | Weiner et al. | 73/862.27 |
| 4,253,325 | 3/1981 | Reed et al. | 73/1 |
| 4,322,965 | 4/1982 | Bickford | 73/1 C |

Primary Examiner—Willis Little
Attorney, Agent, or Firm—Gifford, Van Ophem, Sheridan, Sprinkle, & Nabozny

[57] ABSTRACT

A torque measuring device is provided for use in conjunction with a valve actuator of the type having a housing and an actuator member movable within the housing in unison with the opening and closure of a valve. The device comprises a mounting plate which is attached to the actuator housing in lieu of the valve. A coupler carried by the mounting plate is detachably secured to the actuator member so that the coupler moves in unison with the actuator member. A double acting piston and cylinder arrangement is attached to the coupler so that the torque applied to the valve actuator member is transmitted to the piston. Fluid gases measure the force imposed on the piston and thus the torque which is applied to the actuator member.

8 Claims, 3 Drawing Figures

TORQUE MEASURING DEVICE

BACKGROUND OF THE INVENTION

I. Field of the Invention

The present invention relates generally to torque measuring devices and, more particularly, to a torque measuring device for use with a valve actuator.

II. Description of the Prior Art

The previously known valve actuators typically comprise a housing which is mounted to a valve housing. An actuator member is rotatably mounted in the housing and mechanically connected to a valve in the valve housing so that rotation of the actuator member in a first direction simultaneously moves the valve towards its closed position. Conversely, rotation of the actuator member in the opposite direction moves the valve towards its open position.

Many of the previously known valve actuator assemblies include reversible motor means for rotatably driving the actuator motor while other actuator assemblies use only a manually operated handwheel to open and close the valve. Furthermore, many of the previously known motor driven valve actuators with motors also include a handwheel which can also be used to open and/or close the valve.

A number of the previously known valve actuators also include torque overload limit switches which are activated when the torque applied to the actuator member exceeds a predetermined amount. Typically, one switch is responsive to the torque applied to the actuator member in one rotational direction while a second switch is responsive to the torque applied to the actuator member in the opposite direction. The switches are activated in the event of a jammed valve condition and provide a signal used to deactivate the motor to prevent motor damage and/or provide an alarm signal to an operator.

One disadvantage of the previously known valve actuators with torque overload switch assemblies is that it is difficult to set or adjust the torque settings of the switch assemblies after the valve actuator has been installed in the field. An improperly adjusted switch may disadvantageously generate the torque overload signal when, in fact, no torque overload condition exists. Conversely, an improperly adjusted switch may fail to generate a torque overload signal when such a condition exists and damage not only the motor but other components of the valve actuator or the valve assembly.

SUMMARY OF THE PRESENT INVENTION

The present invention overcomes the above-mentioned disadvantages by providing a device for measuring the torque applied to the actuator member of a valve actuator which is portable, simple and inexpensive in construction and yet effective in operation.

In brief, the device of the present invention comprises a mounting plate which is detachably secured to the housing of the valve actuator in place of the valve assembly. A coupler is rotatably carried by the plate and detachably secured to the actuator member so that the coupler and actuator member move in unison with each other.

An elongated torque transmission arm has one end secured to the coupler so that the arm extends radially outwardly from the coupler. The other end of the arm is secured to a double acting piston which is longitudinally slidably mounted within a cylinder and divides the cylinder into two closed chambers. Each chamber is filled with an incompressable fluid, such as oil, and a fluid pressure gage is fluidly connected to each chamber.

In operation, the piston and cylinder together form a force responsive means which translates the force applied to the piston to a pressure reading on the gages. Since the coupler is connected to the actuator member, the pressure reading on the gages is directly proportional to the torque imposed on the actuator member.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
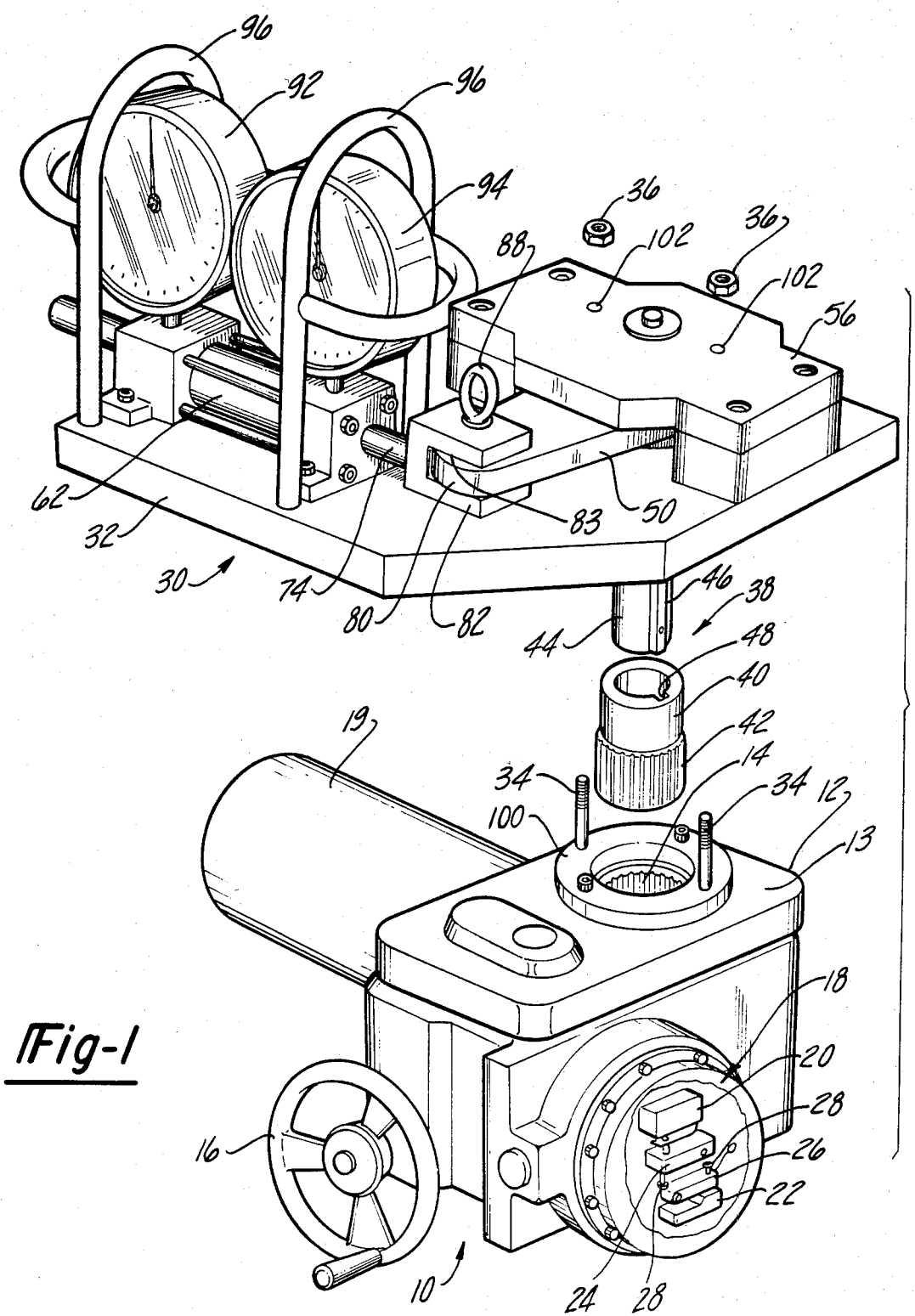
FIG. 1 is an exploded perspective view illustrating a preferred embodiment of the present invention.

With reference first to FIG. 1, a valve actuator 10 is thereshown having a housing 12 with an upper mounting surface 13. During normal operation of the valve actuator 10, a valve housing (not shown) containing a valve is secured to the housing surface 13 by conventional means.

The valve actuator 10 includes an actuator member 14 rotatably mounted in the housing 12 and illustrated in FIG. 1 as an internally splined gear. With the valve actuator 10 secured a valve housing (not shown) the actuator member 14 and valve are mechanically connected together. Thus, rotation of the actuator member 14 in one direction moves the valve towards its closed position while, conversely, rotation of the actuator member 14 in the opposite direction moves the valve towards its open position.

Still referring to FIG. 1, a handwheel 16 is rotatably mounted and excessible exteriorly of the valve actuator housing 12. The handwheel 16 is mechanically connected by conventional means to the actuator member 14 so that rotation of the handwheel 16 in one direction rotatably drives the actuator member 14 in a first direction and vice versa. The valve actuator 10 also includes a motor 19 secured to the housing 12 which is mechanically connected to and rotatably drives the actuator member 14. Such motors are typically electrically powered reversible motors although other types of motors can alternatively be used.

A torque overload switch assembly 18 having two limit switches 20 and 22 is mounted to the actuator housing 12. A lever 24 and 26 is associated with each switch 20 and 22, respectively, to selectively activate the switches 20 and 22 and these levers 24 and 26 are mechanically connected and thus responsive to the torque applied to the actuator member 14. Thus, when the torque imposed on the actuator member 14 in a first rotational direction exceeds a predetermined amount, the lever 24 activates the switch 20. Conversely, when the torque on the actuator member 14 exceeds a second predetermined amount in the opposite direction, the lever 26 activates the switch 22. Each lever 24 and 26 also preferably includes an adjustment screw 28 to vary the torque setting at which the switch 20 or 22 is activated. The activation of the switches 20 and 22 is conventionally used to deactivate the motor 19 and/or provide an alarm signal indicative of a jammed valve condition.

Figure 3:
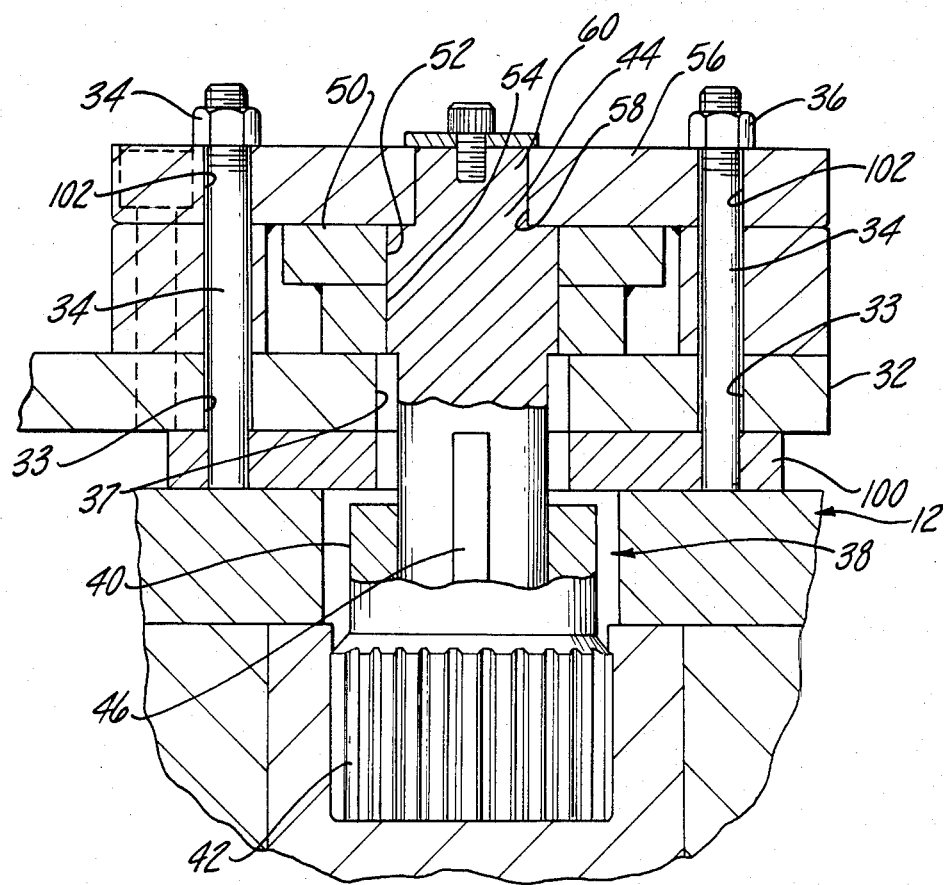
FIG. 3 is a fragmentary sectional view taken substantially along line 3—3 in FIG. 2.

With reference now to FIGS. 1 and 3, the present invention provides a device 30 for measuring the torque imposed on the valve actuator 14 and is particularly suitable for adjusting the setting of the torque overload switches 20 and 22 once the valve actuator 10 has been installed in the field. In order to use the torque measuring device 30, the valve housing (not shown) is first removed from the actuator housing 12 and an adapter ring 100 is secured to the actuator housing 12 by bolts so that the ring 100 is positioned around the actuator member 14. Two elongated studs 34 are mounted to the adapter ring 100 so that the studs 34 protrude outwardly from the ring 100 and thus outwardly from the actuator housing 12.

The torque measuring device 30 comprises a mounting plate 32 having two throughbores 33 (FIG. 3) which register with the studs 34 secured to and extending outwardly from the adapter ring 100. The plate 32 is positioned over the ring 100 so that the studs 34 extend through the bores 33.

With reference still to FIGS. 1 and 3, the torque measuring device 30 includes a coupler 38 which is detachably mechanically connected to the valve actuator member 14. In a preferred form of the invention, the coupler 38 comprises a tubular and cylindrical drive adapter 40 having external splines 42 which mesh with the internally splined actuator member 14. A torque shaft 44 having an upper square boss 54 is then axially slidably positioned through the plate opening 37 and into an axial bore of the drive adapter 40. The torque shaft 44 and drive adapter 40 are connected together by a key 46 and slot 48 arrangement. Consequently, both the drive adapter 40 and the shaft 44 are mechanically connected to and move in unison with the actuator member 14. Furthermore, both the drive adapter 40 and shaft 44 are also preferably available in a plurality of different sizes in order to accommodate different size valve actuators with different size actuator members 14.

Figure 2:
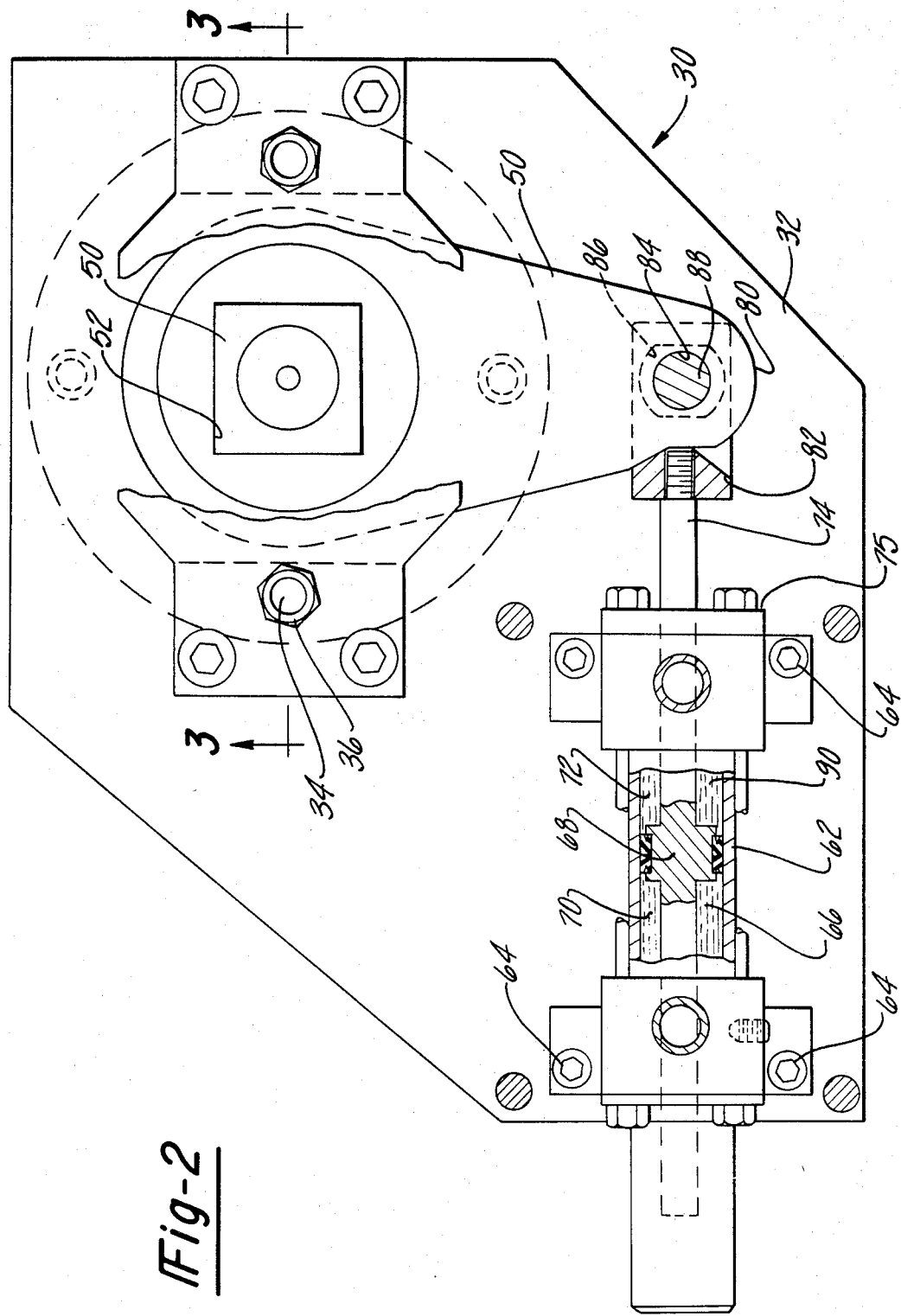
FIG. 2 is a top fragmentary sectional view of the preferred embodiment of the invention.

With reference now particularly to FIGS. 2 and 3, an elongated torque arm 50 having a square throughbore 52 at one end is positioned over the top of the shaft 44. The arm 50 abuts against the plate 32 and the square boss 54 is positioned within the square bore 52 of the arm 50. Consequently, the arms 50 extends radially outwardly from and rotates in unison with the shaft 44.

In order to prevent axial displacement of the shaft 44 and arm 50, a cover 56 having two bores 102 through which the studs 34 extend is positioned over and entraps the arm 50 between the cover 56 and plate 32. The shaft 44 also preferably includes an upper reduced diameter portion 60 which is positioned through an opening 58 in the cover 56 to prevent bending of the shaft 44. The cover 56 is then secured to the studs 34 by nuts 36 thus simultaneously securing the plate 32 to the actuator housing 12.

With reference now particularly to FIGS. 1 and 2, a fluid cylinder 62 is secured to the mounting plate 32 by fasteners 64 and defines a closed fluid chamber 66. A double acting piston 68 is longitudinally slidably mounted within the cylinder 62 and divides the fluid chamber 66 into two subchambers 70 and 72. A piston rod 74 is secured to the piston 68 and extends outwardly from one end 75 of the cylinder 62. Both the cylinder 62 and piston rod 74 are positioned on the mounting plate 32 so that the axis of the piston rod 74 is generally perpendicular to the axis of the piston and intersects the outer free end 80 of the arm 50.

Still referring to FIGS. 1 and 2, a clevis 82 having a U-shaped channel 83 (FIG. 1) is secured to the outer end of the piston rod 74 and the free end 80 of the arm 50 is positioned within the clevis channel 83. A throughbore 84 is formed through the clevis 82 which registers with an opening 86 formed through the arm 50. The arm 50 and the clevis 82 are detachably secured together by a pin 88 which is insertable through the registering bores 84 and 86.

Both subchambers 70 and 72 of the cylinder 62 are filled with an incompressable fluid 90, such as oil. In addition, a first fluid pressure gage 92 (FIG. 1) is fluidly connected with the first subchamber 70 while a second fluid pressure gage 94 (FIG. 1) is fluidly connected to the second subchamber 72 so that the gages 92 and 94 measure the fluid pressure in the subchambers 70 and 72, respectively. The cylinder 62 together with the gages 92 and 94 thus form a force responsive means in which the piston 68 resists the force imposed upon the piston 74 while the pressure gages 92 and 94 provide an indication of the magnitude of the linear force imposed upon the piston rod 74. A protective cage 96 is also preferably secured to the mounting plate 32 and extends around and protects the gages 92 and 94 from physical damage.

In operation, the valve actuator housing 12 is first removed from the valve housing and the adapter ring 100 is secured to the actuator housing 12. The cover 56 together with the arm 50, drive adapter 40 and shaft 44 are them removed from the plate 32 and the plate 32 is then positioned over the receiving studs 34 on adapter ring 100. The drive adapter 40 and drive shaft 44 are then inserted through the plate opening 37 and mechanically connected with the actuator member 14 in the previously described fashion. The arm 50 is then positioned over the top of the shaft 40 so that the square boss 50 of the shaft 44 is positioned within the square hole 52 in the arm 50. The cover 56 is thereafter secured to the mounting plate 32 by the fasteners 36 which simultaneously secure the plate 32 to the valve housing 12.

The handwheel 16 on the valve housing 12 is then manually rotated which rotates the arm 50 until the end 80 of the arm 50 is positioned within the clevis channel 83 and the clevis 82 and arm 50 are fastened together by the pin 88. Once the clevis 82 and arm 50 are secured together by the pin 88, any torque imposed upon the actuator member 14 is translated into a linear force which is imparted to the piston rod 74.

In order to set the torque overload switches 20 and 22, the handwheel 16 is first rotated in one direction. In doing so, a torque is imposed upon the actuator member 14 and, simultaneously, a linear force in one direction is imposed upon the piston rod 74. This linear force increases the pressure in one of the subchambers 70 or 72 and causes an increased pressure reading on its corresponding pressure gage 92 or 94, respectively. When the desired pressure reading on the pressure gage 92 or 94 is obtained which corresponds to the desired torque setting of the valve actuator, the appropriate torque overload switch 20 or 22 is then adjusted accordingly.

Similarly, in order to adjust the torque setting of the other limit switch 20 or 22, the valve actuator handwheel 16 is rotated in the opposite direction until the desired pressure reading on the other gage 92 or 94 is obtained. Once obtained, the other torque overload switch is adjusted accordingly. Finally, the torque measuring device 10 and adapter ring 100 are simply removed from the valve actuator housing 12 and the actuator housing 12 and valve housing are reconnected together for normal operation.

From the foregoing, it can be seen that the device of the present invention provides a simple and relatively inexpensive device for adjusting the torque overload switches of a valve actuator. Since the device of the present invention is portable and requires no external power source, it may be easily used in the field at the installation site of the valve actuator.

It will also be understood that the pressure readings on the gages 92 and 94 will vary for the same magnitude of torque imposed on the actuator member depending upon the size of the drive adapter 90 and shaft 44. Only a simple translation, however, is necessary in order to determine the magnitude of the torque from the pressure reading.

Having described my invention, however, many modifications thereto will become apparent to those skilled in the art to which it pertains without deviation from the spirit of the invention as defined by the scope of the appended claims.

I claim:

1. For use in conjunction with a valve actuator having a housing, an actuator member movable between an open and a closed position, means for moving said actuator member between said open and closed positions, a device for measuring the force applied by said moving means to said actuator member comprising:

a mounting plate;
   means for detachably securing said mounting plate to said housing,
   a coupler carried by said plate,
   means for detachably securing said coupler to said actuator member so that said coupler and said actuator member move in unison with each other,
   a force responsive means carried by said plate, said force responsive means having an input member wherein said force responsive means comprises a cylinder having a closed chamber, a piston slideably mounted within said cylinder and dividing said cylinder chamber into two subchambers,
   means for indicating the magnitude of force imposed on said input member,
   means for connecting said coupler to said input member.

2. The invention as defined in claim 1 wherein said actuator member is rotatably mounted in the valve actuator housing and wherein said coupler comprises an arm having one end secured to said actuator member and its other end secured to said input member.

3. The invention as defined in claim 1 wherein said input member comprises an elongated rod attached at one end to said piston and attached at its other end to said coupler.

4. The invention as defined in claim 3 wherein said indicating means comprises a pair of fluid pressure gages, one of said fluid gages being fluidly connected to each subchamber.

5. The invention as defined in claim 4 wherein said subchambers are filled with an incompressible fluid.

6. The invention as defined in claim 5 wherein said imcompressible fluid is oil.

7. The invention as defined in claim 1 wherein said actuator member comprises an internally splined gear and wherein said coupler comprises an externally splined gear which meshes with said internally splined gear, a shaft coaxial with and keyed to said externally splined gear, and an arm secured to and extending radially outward from said shaft.

8. The invention as defined in claim 7 wherein said shaft is detachably secured to said arm.

* * * * *

UNITED STATES PATENT OFFICE
CERTIFICATE OF CORRECTION

Patent No. 4,498,336　　　　　　　Dated February 12, 1985

Inventor(s)　Thomas B. Dalton

It is certified that error appears in the above-identified patent and that said Letters Patent are hereby corrected as shown below:

Column 3, line 10 delete "14" and insert --10--.

Column 3, line 51 delete "arms" insert --arm--.

Column 4, line 26 after "piston" insert --rod--.

Column 4, line 43 delete "40" insert --44--.

Column 4, line 44 delete "50" insert --54--.

Column 4, line 46 delete "fasteners" insert --nuts--.

Column 4, line 50 after "which" insert --in turn--.

Column 5, line 6 after "switch" insert --20 or 22--.

Column 5, line 7 delete "10" insert --30--.

Column 5, line 9 after "valve" insert --(not shown)--.

Column 5, line 14 after "switches" insert --20 and 22--.

Column 5, line 14 after "actuator" insert --10--.

Column 5, line 20 after "member" insert --14--.

Column 5, line 21 delete "90" insert --40--.

Signed and Sealed this

Twenty-third Day of July 1985

[SEAL]

Attest:

DONALD J. QUIGG

Attesting Officer　　Acting Commissioner of Patents and Trademarks